2,983,630
TREATING A CELLULOSE-CONTAINING BASE TO IMPART THERETO ALKALI RESISTANCE, COMPOSITION THEREFOR AND THE RESULTANT PRODUCT

Bryce P. Anderson, Lafayette, Calif., assignor to De Soto Chemical Coatings, Inc., a corporation of Delaware
No Drawing. Filed Aug. 25, 1958, Ser. No. 757,136
19 Claims. (Cl. 117—148)

My invention relates to compositions which are especially useful for coating and impregnating wood and wood products to impart a high degree of alkali resistance to said coated or impregnated materials.

It is well known that wooden products when used under highly alkaline conditions rapidly deteriorate to the point of breakdown, which requires their replacement after a relatively short in-stream life. This sensitivity of wooden products to highly alkaline conditions had resulted in the gradual replacement of such products by stainless steel or rubberized products capable of a much longer in-stream life.

In my copending application, Serial No. 741,728, filed June 13, 1958, I disclose my discovery that dicarboxylic-acid-modified alkali-condensed phenol-aldehyde and analogous resins, prepared in accordance with my invention, disclosed in said application, are especially valuable as wood coating and impregnating agents which I have found effective to impart a high degree of acid resistance, and I further disclose my finding that oxalic acid alone or with another one or more dicarboxylic acid as a modifier of the resin, had been found especially effective to impart high acid resistance when the so modified resin was baked in accordance with the conditions set forth in my aforesaid application. My optimum compositions had an acid content of about 25–100 percent, based on resin solids, baked at about 130–250° F. for about 30–150 minutes.

I have further found that dibasic-acid-modified resins of the character disclosed in my aforesaid application, by further modification, become highly resistant to alkalies and in this condition are valuable as coating and impregnating agents for wood and wood products for the purpose of imparting alkali resistance to such materials. An important advantage accruing to my invention is that wood and wood products so treated are rendered highly alkali resistant without risk of damage to the cellular structure of the wood.

In determining chemical resistance I have used a highly accelerated test. W. & R. Balston extraction thimbles were impregnated with the given formulations and baked, which thimbles so treated were suspended in a 25% concentration bath of sodium hydroxide maintained at 160–180° F. for 16 hours and at room temperature for 8 hours in each 24 hour period. The immersed time required for deterioration-destruction of the normal properties was recorded as an indication of the effectiveness of the impregnant. Under such conditions untreated thimbles were swollen and soft in 5 seconds and swelling became extreme after 30 seconds. These thimbles are well known articles of commerce and are made of high grade paper.

The results of the accelerated tests have been confirmed by laboratory and field testing.

My invention is applicable generally to phenol-aldehyde resins which are recognized as an extensive class suitable for use as coatings. A typical example of such a resin may be prepared, using standard procedure, and comprising:

1 mole phenol
2 moles formaldehyde
0.3 mole sodium hydroxide

The above example is merely illustrative of the "phenolic systems" to which my invention is applicable and which may include a wide variety of resin not only of phenol-formaldehyde but also of aldehyde condensations of aliphatic phenols such as amyl phenol, butyl phenol, nonyl phenol, as well as bis-phenol, resorcinol, cresol, melamine, urea, etc. Hence, use herein of the expression "aldehyde condensation resins" should be understood as including the various types of condensation products, which are considered equivalents for my purposes.

Further summarizing in regard to the above example, not only may the phenol be partially or wholly replaced by substitute phenols, the phenol-formaldehyde ratio may be changed, the formaldehyde may be replaced by para-formaldehyde and the system may, if desired, be acid condensed to vary the base resin used in the system. Such variations and the procedures incident thereto are well within the knowledge of those skilled in the art in connection with the preparation of resins of this character.

In my aforementioned copending application I disclose the modification of aldehyde condensation resins by means of a relatively high proportion of dicarboxylic acid a substantial proportion of which consists of oxalic acid, the dicarboxylic acid being preferably present in a quantity consisting of about 25% to 100% by weight of the resin solids and the oxalic acid constituting about one-third to one-half of the dicarboxylic acid.

The acid-modified resins as described in my aforesaid copending application, while highly resistant to acids, were found to have a relatively low resistance to alkali. I have found that such acid-modified resins may be rendered highly resistant to alkalies by the addition of relatively small amounts of certain metallic ions, while retaining high acid resistance.

As a result of extensive experimentation I have discovered that certain metallic ions in a +3 state of oxidation impart to these acid-modified resins an astounding degree of alkali resistance. The metals which I have found most valuable in this regard are chromium and bismuth. Chromium has been found to yield superior results as compared to any of the other metallic compounds, but my investigations have shown that a number of metallic ions in the +3 oxidation state contribute alkali resistance to a degree markedly superior to metallic ions available in other oxidation states. Accordingly, I include within the scope of my invention or discovery the use of such other metals as aluminum, iron, cerium, titanium, antimony, zirconium, arsenic, vanadium and manganese, all in the trivalent state. Said materials may be employed in any of their water- or alcohol-soluble salts having a +3 valence, such as aluminum trichloride, ferric sulfate, chromic acetate, bismuth trichloride, chromic sulfate, titanium trichloride, cerous nitrate, antimony trichloride, vanadium trichloride, arsenic trioxide, etc. My preferred reagent is chromic acetate.

Procedure

The base phenolic resin is prepared according to standard procedure for alkali condensation reactions, which procedure is well known to those skilled in the art. Such resins may take any of the various forms outlined above.

The dicarboxylic acid modifier in a suitable solvent such as ethanol or methanol and the trivalent metallic ion containing salt which is also in a suitable solvent such as water or alcohol, as the individual case may require, are added to the cold base resin in such amounts as to yield about 25% to 85% or more, up to about 100%, dicarboxylic acid and about 0.5% to 2.0% trivalent metallic ion, based on base resin solids, in the finished product. In certain cases, additional solvents may be employed to achieve a lower viscosity impregnant with better penetrating powers.

It should be understood that the acid-modified resin may be produced in conformity with any factor or factors of the disclosure of my copending application above referred to.

The material to be impregnated is then dipped in the impregnant for a sufficient period of time to effect the desired degree of impregnation, usually for a period of not less than five minutes at room temperature. The impregnation step may be under atmospheric pressure, but vacuum or pressure impregnation is particularly effective. The impregnated material after drying is then baked at about 125° F. to 225° F. for a period of time ranging from about 50 minutes to about 120 minutes. Optimum results have been achieved with a baking schedule of 150° F. for 90 minutes.

In a series of tests I treated a certain acid-modified phenolic resin with a trivalent chromium salt in a variety of concentrations according to the procedure described above, with variations in the salt concentration which may be represented as follows:

| Test Thimble | Percent Chromic Acetate | Percent Chromium Ion |
|---|---|---|
| A | 2.5 | 0.526 |
| B | 5.0 | 1.05 |
| C | 7.5 | 1.58 |
| D | 8.9 | 1.87 |

These thimbles were baked as above described and tested by alkali immersion according to the procedure outlined above.

After immersion of 69 days the untreated thimble was in very poor condition, partially dissolved, very soft and swollen; thimble A was firm, although there was some interfacial deterioration with slight swelling of the immersed half; product B was in excellent condition, displaying only slight swelling in the interface region, while composition C was almost in as good condition as B. Composition D was in the poorest condition in caustic resistance of the four resins, showing slight interface swelling and deterioration with softening and very slight deterioration of the immersed half, but in markedly better condition than the untreated "control" thimble. None of the four treated resins displayed any vapor phase deterioration.

The conclusions to be drawn are that the optimum metal ion concentration lies in the region embodied in items B and C, or from approximately 1.0 to 1.6 percent in chromium ion concentration and about 5.0 to 7.5 percent of this chromium salt. However, as compared with the untreated phenolic, all four of the products containing a chromium ion concentration range of from about 0.5 to 2.0 percent, in round numbers, showed a marked alkali resistance as compared to the resin lacking the metal.

To illustrate the above statement as to the effectiveness of seven higher concentrations of trivalent ion against alkali as compared to the same resin lacking said ion, I found in testing a certain resin with 50 percent added oxalic acid that the presence of 1.87 percent chromium ion gave an alkali resistance of 45 days as against one hour where there was no trivalent ion present.

It will be understood that all the figures shown indicate percentage based on the weight of the aldehyde condensation resin solids.

The above described thimble tests have been confirmed in connection with wood impregnated with the products under consideration.

My work further establishes that the presence of +3 valence metal ions in a phenolic resin unmodified by dicarboxylic acid, fails to provide alkali resistance comparable to the resins which are acid modified. Hence, it is my conclusion that both the dicarboxylic acid and trivalent metal are desirable constituents for optimum alkali resistance.

I have also ascertained that alkali resistance increases as the dibasic acid concentration is increased within the limits of about 25–100 percent of resin solids. It is considered that optimum alkali resistance is obtainable with a concentration of about 40–60 percent dibasic acid.

I find also that the acid-modified resins characterized by the presence of trivalent metal ions, as described above, show a high resistance to acid as well as alkali. Thus, resin impregnated thimbles identical in character to those described above as used to determine alkali resistance, were subjected to 25% sulfuric acid at 180° F. and evidenced resistance for periods ranging from 114 to 400 hours. By comparison a similar resin employing the usual (below 15 percent) catalytic acid concentration shows an acid resistance of only 12 seconds. However, optimum acid resistance is found where the metal ion is in relatively lower concentrations, even down to below 0.5 percent, and when no chromium ion is present, and diminishes as this ion is added.

While, generally speaking, the optimum baking conditions of the products described herein are in the range of about 125° to 225° F. for about 50 to 120 minutes, the optimum baking temperatures for any one system are dependent upon the particular dicarboxylic acid or acids used as well as the proportion of acid used to the base resin solids. The character of the particular base resin itself also may influence the adjustment of the optimum baking conditions. The proportion of metallic ion present does not appear to be a factor affecting materially the baking conditions required for the various systems. While it may be said that determination of the optimum baking conditions for each system may require some experimentation, one may say as a general guide that usually, when the oxalic acid component of the dicarboxylic acid is of the magnitude of 50 percent or higher of the total dicarboxylic acid present, the optimum baking conditions will be approximately in the region of 145° F. to 175° F. for a period of from 80–110 minutes. A few specific illustrative examples are as follows:

(a) A 50 percent oxalic acid, phenol-formaldehyde, metallic-ion-containing system is best cured at about 150° F. for about 90 minutes.

(b) The same system as described in the last preceding paragraph but with one-half of the oxalic acid replaced with maleic anhydride is best cured at about 155–160° F. for about 80 minutes.

(c) Replacing two-thirds of the oxalic acid in the same example with maleic anhydride, the best results are obtained with a cure at about 200° F. for about 75 minutes.

(d) In a similar system wherein the dicarboxylic acid component is made up of one part of oxalic acid and two parts of succinic anhydride, the ideal cure is obtained with a temperature of about 200° F. for about 75 minutes.

(e) Reversing the ratio to two parts of oxalic acid to one part succinic anhydride, the best results are obtained with a cure at about 175° F. for approximately 90 minutes.

It will be understood that in the examples referred to the conditions specified are those which have been found to produce optimum chemical resistance properties in accordance with my invention.

It is believed that the examples given will serve as an adequate guide to enable those skilled in the art to ascertain the ideal curing conditions for any system coming within the scope of my invention with a minimum of experimentation.

Various changes coming within the spirit of my invention may suggest themselves to those skilled in the art; hence I do not wish to be limited to the specific examples specified herein or uses mentioned except to the extent indicated in the appended claims.

I claim:

1. A method of inhibiting the deterioration of a cellulose-containing base normally deteriorating in the presence of acid and alkali, comprising treating the said cellulose-containing base with a liquid impregnating composition formed from a mixture of (a) a thermosetting resin selected from the group consisting of phenol-aldehyde and amine-aldehyde resins; (b) at least one dicarboxylic acid; and (c) a salt of a trivalent metal ion; the dicarboxylic acid being present in the mixture in an amount at least 25% based on resin solids, at least one-third of the dicarboxylic acid being oxalic acid, the salt of the trivalent metal ion being present in the impregnating composition to yield between about 0.5 and about 2.0% of trivalent metal ion based on resin solids; and drying and baking the so-treated base at a temperature above about 125° F. and below the temperature at which the acid and alkali resistance of the baked base is impaired.

2. The method defined in claim 1 in which the cellulose-containing base is baked at a temperature between about 125° F. and 225° F. for a period of time between about 50 minutes and about 120 minutes.

3. The method defined in claim 1 in which the cellulose-containing base is selected from the group consisting of wood and wood products.

4. The method defined in claim 1 in which the cellulose-containing base is paper.

5. The method defined in claim 1 in which the dicarboxylic acid is only oxalic acid.

6. The method defined in claim 1 in which the dicarboxylic acid contains about 50% of oxalic acid.

7. A method as in claim 1 wherein the metal ion is that of the group consisting of bismuth and chromium.

8. A method as in claim 1 wherein the metal ion is that of chromium.

9. A method of inhibiting the deterioration of a cellulose-containing base normally deteriorating in the presence of acid and alkali, comprising treating the said cellulose-containing base with a liquid impregnating composition formed from a mixture of (a) a thermosetting resin selected from the group consisting of phenol-aldehyde and amine-aldehyde resins; (b) at least one dicarboxylic acid; and (c) a salt of a trivalent metal ion, the dicarboxylic acid being present in the mixture in an amount between about 25% and about 100% based on resin solids, at least one-third of the dicarboxylic acid being oxalic acid, the salt of the trivalent metal ion being present in the impregnating composition to yield between about 0.5 and 2.0% of trivalent metal ion based on resin solids; and drying and baking the so-treated base at a temperature above about 125° F. and below the temperature at which the acid and alkali resistance of the baked base is impaired.

10. A method of inhibiting the deterioration of a cellulose-containing base normally deteriorating in the presence of acid and alkali, comprising treating the cellulose-containing base with a liquid impregnating composition formed from a mixture of (a) a thermosetting resin selected from the group consisting of phenol-aldehyde and amine-aldehyde resins; (b) at least one dicarboxylic acid; and (c) a salt of a trivalent metal ion; the dicarboxylic acid being present in the mixture in an amount between about 25% and about 100% based on resin solids, at least one-third of the dicarboxylic acid being oxalic acid, the salt of the trivalent metal ion being present in the impregnating composition to yield between about 0.5 and about 2.0% of trivalent metal ion based on resin solids; and drying and baking the so-treated cellulose-containing base at a temperature between about 145° F. and about 175° F.

11. As an alkali-resistant composition, an aldehyde condensation resin modified by the addition of at least about 25 per cent of an ingredient consisting of at least one dicarboxylic acid, of which ingredient at least about one-third is oxalic acid, together with about 0.5% to about 2.0% of a trivalent metal ion, said proportions being based on base resin solids in the finished product, said composition having been cured by baking to render it alkali resistant, said aldehyde condensation resin being selected from the group consisting of phenol-aldehyde and amine-aldehyde resins.

12. A composition as defined in claim 11, wherein the trivalent ion is that of a member of the group consisting of bismuth and chromium.

13. A composition as defined in claim 11, wherein the trivalent ion is that of chromium.

14. A liquid coating composition especially suitable for application to wood and other materials, said composition comprising an aldehyde condensation resin modified by the addition of at least 25% of an ingredient consisting of at least one dicarboxylic acid, at least about one-third of which ingredient is oxalic acid, together with a salt of a trivalent metal ion in a quantity to yield about 0.5 to 2.0% of the metal ion, said acid and ion proportions being based on base resin solids in the finished product, which composition, when cured, will be highly resistant to acids and alkalies, said aldehyde condensation resin being selected from the group consisting of phenol-aldehyde and amine-aldehyde resins.

15. An impregnating composition formed from a mixture of (a) a thermosetting resin selected from the group consisting of phenol-aldehyde and amine-aldehyde resins; (b) a dicarboxylic acid selected from the group consisting of oxalic acid, and an admixture of oxalic acid with at least one other dicarboxylic acid, the oxalic acid constituting at least one-third of said admixture, said dicarboxylic acid being present in an amount between about 25% and about 100% based on resin solids; and (c) a salt of a trivalent metal ion in an amount to yield between about 0.5 and about 2.0% of trivalent metal ion based on resin solids.

16. A cellulose-containing base which is resistant to the action of acid and alkali, said cellulose-containing base carrying the heat-reacted impregnating composition formed from a mixture of (a) a thermosetting resin selected from the group consisting of phenol-aldehyde and amine-aldehyde resins; (b) a dicarboxylic acid selected from the group consisting of oxalic acid, and an admixture of oxalic acid with at least one other dicarboxylic acid medium, the oxalic acid constituting at least one-third of said admixture, the dicarboxylic acid being present in the mixture in an amount at least about 25% based on resin solids; and (c) a salt of a trivalent metal ion in an amount to yield between about 0.5 and about 2.0% of trivalent metal ion based on resin solids.

17. The product defined in claim 16 in which the cellulose-containing base is selected from the group consisting of wood and wood products.

18. The produce defined in claim 16 in which the salt of a trivalent metal ion is selected from the group consisting of bismuth and chromium.

19. The product defined in claim 16 in which the salt of a trivalent metal ion is chromium.

References Cited in the file of this patent

UNITED STATES PATENTS

| | | |
|---|---|---|
| 2,225,256 | Colio | Dec. 17, 1940 |
| 2,233,875 | Schmidt et al. | Mar. 4, 1941 |
| 2,343,089 | Smith | Feb. 29, 1944 |
| 2,629,648 | Ericks | Feb. 24, 1953 |
| 2,629,703 | Vogelsang | Feb. 24, 1953 |
| 2,656,296 | Gangaard | Oct. 20, 1953 |
| 2,749,257 | Krup et al. | June 5, 1956 |